US010724501B2

(12) United States Patent
Carulla (10) Patent No.: US 10,724,501 B2
(45) Date of Patent: Jul. 28, 2020

(54) METHODS AND SYSTEMS OF OPERATING A SET OF WIND TURBINES (71) Applicant: Alstom Renewable Technologies, Grenoble (FR)

(72) Inventor: Piera Jordi Carulla, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 383 days.

(21) Appl. No.: 15/302,284

(22) PCT Filed: Feb. 5, 2015

(86) PCT No.: PCT/EP2015/052386
§ 371 (c)(1),
(2) Date: Oct. 6, 2016

(87) PCT Pub. No.: WO2015/118055
PCT Pub. Date: Aug. 13, 2015

(65) Prior Publication Data
US 2017/0067445 A1 Mar. 9, 2017

(30) Foreign Application Priority Data
Feb. 6, 2014 (EP) ..................................... 14382042

(51) Int. Cl.
*F03D 9/00* (2016.01)
*F03D 9/25* (2016.01)
(Continued)

(52) U.S. Cl.
CPC ............. *F03D 9/25* (2016.05); *F03D 7/0284* (2013.01); *F03D 7/0296* (2013.01); *F03D 7/048* (2013.01);
(Continued)

(58) Field of Classification Search
CPC ........ F03D 9/25; F03D 7/0284; F03D 7/0296; F03D 7/048; F03D 9/005; H02J 3/386; H02K 7/183; H02P 9/04
See application file for complete search history.

(56) References Cited

U.S. PATENT DOCUMENTS 8,823,193 B1 * 9/2014 Yazghi ................... F03D 7/048
290/44
2009/0055030 A1 * 2/2009 Mayor .................. F03D 7/0284
700/287
(Continued)

FOREIGN PATENT DOCUMENTS

| EP | 2232667 B1 | 9/2010 |
| WO | 200173518 A1 | 10/2001 |
| WO | 2012139584 A1 | 10/2012 |

OTHER PUBLICATIONS

International Search Report and Written Opinion dated Aug. 4, 2015 which was issued in connection with PCT Patent Application No. PCT/EP2015/052386 which was filed on Feb. 5, 2015.

*Primary Examiner* — Viet P Nguyen
(74) *Attorney, Agent, or Firm* — Dority & Manning, P.A.

(57) ABSTRACT

Methods of operating a set of wind turbines for providing a total power demand to a grid according to a grid requirement are provided. A first group of wind turbines is configured to generate an individual active power based on an individual set-point. First individual set-points are generated for the first group such that the set of wind turbines generates the total active power. If a selection of the first group of wind turbines is operating within an individual exclusion range, the operation of the se wind turbines is limited to a maximum period. When the maximum period is reached, second individual set-points are generated to cause these wind turbines to operate outside exclusion range, and third individual set-points are generated for one or more other wind (Continued)

turbines to cause the set of wind turbines to generate the total active power. Systems suitable for such methods are also provided.

20 Claims, 3 Drawing Sheets

(51) Int. Cl.
    *F03D 7/02*     (2006.01)
    *H02J 3/38*     (2006.01)
    *F03D 7/04*     (2006.01)
    *H02K 7/18*     (2006.01)
    *H02P 9/04*     (2006.01)

(52) U.S. Cl.
    CPC .............. *F03D 9/257* (2017.02); *H02J 3/386* (2013.01); *H02K 7/183* (2013.01); *H02P 9/04* (2013.01); *F05B 2270/1033* (2013.01); *F05B 2270/337* (2013.01); *Y02E 10/723* (2013.01); *Y02E 10/725* (2013.01); *Y02E 10/763* (2013.01)

(56) References Cited

U.S. PATENT DOCUMENTS

| | | | | |
|---|---|---|---|---|
| 2010/0072751 | A1* | 3/2010 | Andersen | F03D 7/0272 290/44 |
| 2010/0274401 | A1* | 10/2010 | Kjaer | F03D 7/0284 700/287 |
| 2013/0140817 | A1* | 6/2013 | Yin | F03D 7/00 290/44 |
| 2013/0270827 | A1* | 10/2013 | Couchman | F03D 7/028 290/44 |
| 2014/0001763 | A1* | 1/2014 | Kragelund | H02P 9/04 290/55 |
| 2014/0062086 | A1* | 3/2014 | Mata Dumenjo | H02J 3/1842 290/44 |
| 2014/0375052 | A1* | 12/2014 | Nielsen | F03D 7/00 290/44 |
| 2015/0148974 | A1* | 5/2015 | Diedrichs | H02J 3/16 700/287 |
| 2015/0159626 | A1* | 6/2015 | Tarnowski | F03D 7/028 290/44 |
| 2015/0219075 | A1* | 8/2015 | Cardinal | F03D 7/00 290/44 |
| 2015/0249415 | A1* | 9/2015 | Babazadeh | H02J 3/16 290/44 |
| 2015/0300318 | A1* | 10/2015 | Mayer | F03D 7/0272 290/44 |

* cited by examiner

METHODS AND SYSTEMS OF OPERATING A SET OF WIND TURBINES

CROSS-REFERENCE TO RELATED APPLICATIONS

This application is a national stage application under application under 35 U.S.C. § 371(c) of prior filed PCT application serial number PCT/EP2015/052386, filed on 5 Feb. 2015, which claims priority to European Patent Application EP14382042.1, filed on 6 Feb. 2014. The above-listed applications are herein incorporated by reference.

TECHNICAL FIELD

The present disclosure relates to methods of operating a set of wind turbines and to systems suitable for performing such methods.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. The rotation may be transmitted (optionally through a rotor shaft) to a generator, either directly or through the use of a gearbox. This way, the generator produces electricity which can be supplied to the electrical grid.

During operation of a wind turbine, its structure and components may undergo undesired movements, i.e. oscillatory or repeating displacements in any direction (fore-aft vibrations, side-to-side or lateral vibrations, longitudinal vibrations, torsional vibrations, . . . ) of any magnitude and of any frequency (high or low, constant or varying). If a wind turbine is subjected to the above mentioned collateral movements (e.g. vibrations) during a prolonged period of time, fatigue damage may result.

These undesired movements may occur more easily at specific rotor speeds (rpms) that, depending on the particular configuration of the wind turbine, may induce structural resonance phenomena. In most circumstances, due to the inherent wind variability, modern variable speed wind turbines do not operate at such potentially dangerous rpms for a prolonged period of time. As the wind changes, the rpms may be varied.

Wind turbines are often grouped together in so-called wind farms. A wind farm control is generally aimed at centrally managing and/or controlling the wind farm such that the wind farm as a whole generates, usually according to a planned power generation, a total power to be supplied to the grid. This centralized control of the wind farm may generate suitable individual commands or set-points for the individual control systems of each wind turbine to cause generation of a corresponding amount of active power. The total power generated by the wind farm then should substantially correspond to the active power planned for the wind farm as a whole.

In case of unplanned grid unbalances, a grid operator may issue one or more online requests for the wind farm to vary its power production for compensating said unbalances. Most grid unbalances may refer to an excess of power in the grid, in which case an online request may be generated by the grid operator for the wind farm to reduce the power it is generating.

These online "corrections" may cause at least some of the wind turbines to generate less power than they could, which in most cases is achieved by reducing the rotational speed (rpms) of the rotor. Thus, wind turbines may be ordered to work in a range in which they may experience some undesired movements (as the ones explained before) and corresponding fatigue (in the long term). Additionally, it may be necessary to maintain a wind turbine's operation in such a regime for a prolonged period of time. A wind variation may not necessarily influence the wind turbine's performance to a large extent as it is already producing less than it potentially could.

The present disclosure aims at improving wind farm control and in particular at improving wind farm control in situations wherein a grid requirement is received.

BRIEF DESCRIPTION

In a first aspect, the present disclosure provides a method of operating a set of wind turbines for generating and providing a total active power to a grid according to a grid requirement. A first group of wind turbines of the set of wind turbines is configured to generate an individual active power based on an individual set-point. The method comprises obtaining one or more individual exclusion ranges for the first group of wind turbines, and generating first individual set-points for the first group of wind turbines such that the set of wind turbines generates the total active power.

This first group of wind turbines may comprise all or just some wind turbines of the set of wind turbines. For example, the set of wind turbines (e.g. a wind farm) may comprise variable speed and constant speed wind turbines, in which case the first group may comprise only the variable speed wind turbines. In this example, the constant speed wind turbines may thus be excluded from the first group of wind turbines. The constant speed wind turbines would continue operating as they were, in spite of e.g. a reduced demand of active power. The individual set-points for the first group of wind turbines may thus take this into account.

The method further comprises determining whether a selection of the first group of wind turbines is operating within an individual exclusion range. In case of positive result of said determination, the operation of the selection of wind turbines within exclusion range is limited to a maximum period. When the maximum period is reached by any of the wind turbines of the selection of wind turbines, second individual set-points and third individual set-points are generated.

The second individual set-points are generated for the wind turbines that have reached the maximum period, to cause these wind turbines to operate outside the corresponding exclusion range(s). The third individual set-points are generated for one or more other wind turbines of the first group of wind turbines to cause the set of wind turbines to generate the total active power demand.

A variable speed wind turbine may typically be individually controlled by varying the generator torque and/or the pitch angle of the blades. As a result, aerodynamic torque, rotor speed and electrical power will vary. A wind turbine may normally be operated to follow a predefined power curve in which the power generated depends on the wind speed. Therefore, given a particular wind speed, the generator torque and/or the pitch angle of the blades may be adjusted by an individual control for the wind turbine to produce a particular power as defined by a so-called power curve.

Any power curve typically has an equivalent corresponding rotor speed curve (which is also predefined) in which the rotor speed is defined depending on the wind speed. Given a particular wind speed, the generator torque and/or the pitch angle of the blades may be adjusted by an individual control of an individual wind turbine to cause the wind turbine rotor to rotate at particular rpms as defined by the rotor speed curve. Equivalently, the wind turbine will generate electrical power as defined by the power curve. Therefore, any power value generated by a wind turbine (depending on wind speed) may have its translation in terms of rpms at which the rotor of the wind turbine rotates (also depending on wind speed).

Figure 3:
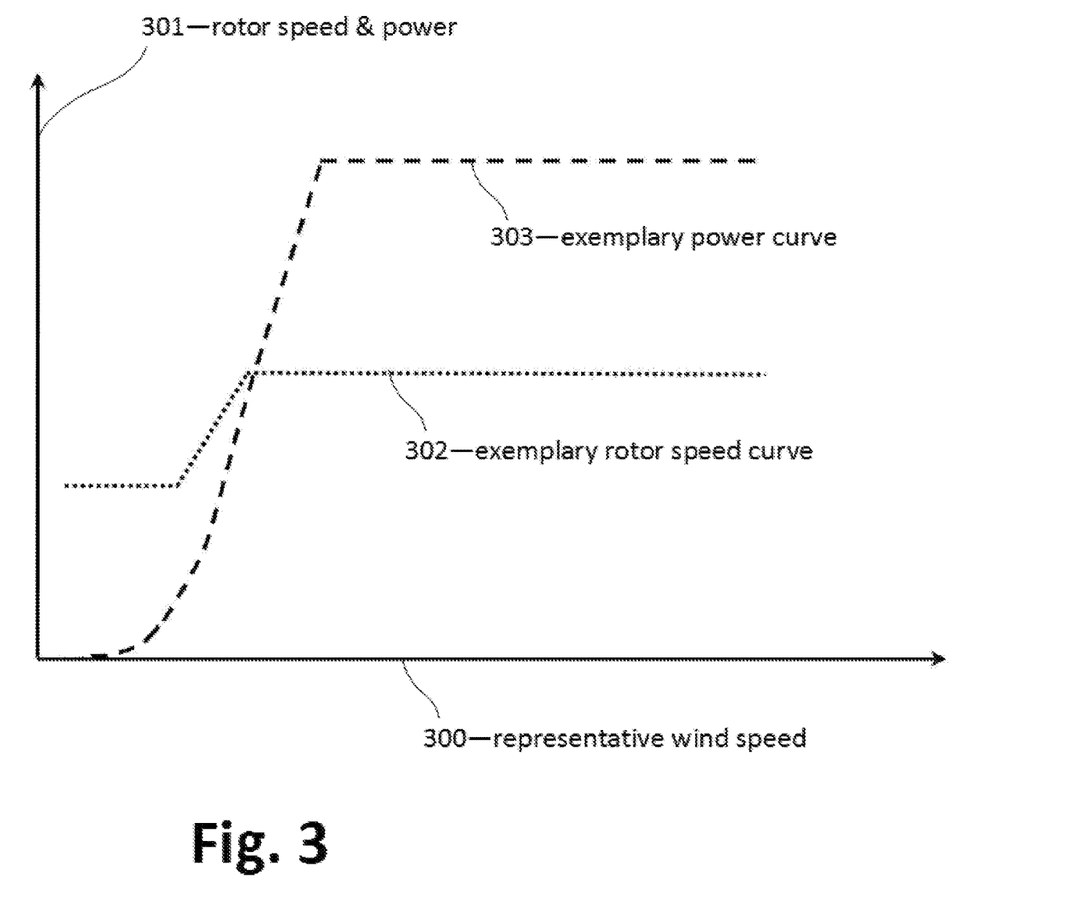
FIG. 3 is a schematic representation of an exemplary rotor speed curve and an exemplary power curve.

FIG. 3 shows a representation of an exemplary rotor speed curve 302 and an exemplary power curve 303 on a coordinates system, wherein the horizontal axis 300 refers to a representative wind speed and the vertical axis 301 refers to rotor speed and power respectively.

Herein, the term "exclusion range" refers to a range of active power production (and corresponding translation into rotor speed) a wind turbine should ideally avoid or (if that is not possible) remain within this range a reduced time, in order to minimize the risk of the wind turbine undergoing undesired problematic movements (e.g. oscillations). On the contrary, when the wind turbine generates power outside such an exclusion range, it may be considered that the rotor of the wind turbine rotates at a speed (rpms) which is not expected to induce particularly damaging movements (such as e.g. resonance) on the wind turbine.

The individual exclusion ranges may be predefined depending on e.g. the type/model of the wind turbines, so they may be provided pre-programmed. Therefore, obtaining the individual exclusion ranges may simply comprise retrieving them from e.g. a corresponding memory or any other suitable storing means.

A wind turbine may have more than one associated exclusion range, depending on the particular configuration of the wind turbine and possibly on other environmental parameters. For example, the location of the wind turbine in a wind farm, along with e.g. the current wind direction, could influence in some way the one or more exclusion ranges which may be defined for the wind turbine. The one or more exclusion ranges of a wind turbine may be calculated or estimated through simulations by using suitable software, or experimentally based on prototypes or real wind turbines.

An aspect of the proposed method may be that a wind farm or a set of wind turbines of the wind farm may be centrally controlled to satisfy online grid requirements, while the risk of some wind turbine(s) to be submitted to problematic loads and/or movements is reduced. Individual set-points generated for different wind turbines may be dynamically compensated together in such a way that each individual set-point may be kept outside exclusion range(s) or, depending on the circumstances, may be inside exclusion range(s) but only for a limited period of time. This way, rotor speeds that may result in undesired wind turbine motions and/or loads may be substantially avoided or limited to short periods of time.

A conventional wind farm control strategy typically generates individual set-points with the aim of satisfying a corresponding grid requirement without taking into account that the rotor of some turbine(s) may rotate at a "problematic" speed. The proposed method may expressly vary at least some of said individual power set-points for making the undesired rotor speeds to be finally acceptable. If these variations (aimed at avoiding "problematic" rotor speeds) cause a certain dissatisfaction of the grid requirement, further variations of the same and/or other individual set-points could be caused for finally achieving this double objective: grid requirement satisfaction and acceptable rotor speeds. Several iterations may be performed until this double objective is achieved.

According to some embodiments, the method may further comprise, for each of the generated (first, second, third) individual set-points, calculating a difference between the individual set-point and the active power that is being generated by the corresponding wind turbine to determine whether it exceeds a difference threshold. In case of positive result of said determination, the individual set-point may be divided into a plurality of partial individual set-points, such that all these partial individual set-points substantially totalize the individual set-point. An aspect of this may be that the partial individual set-points may be sent to the corresponding wind turbine with an elapsed time between them, such that the (whole) individual set-point may be progressively achieved by the wind turbine. A smoother and more efficient operation of the wind turbine may thus result.

Some or all of the generated (first, second and third) individual set-points may be considered too demanding (or too "hard") to be processed adequately by the corresponding wind turbine(s). The speed at which a wind turbine can change its active power (the reaction or actuation speed) may be limited by its design, so that a certain slope (in power units/time units) can be defined for a wind turbine which cannot be exceeded. Consequently, not only power variations but also the time needed to adapt the power output needs can be taken into account. Each "too demanding" individual set-point may thus be split into several partial set-points in such a way that each partial set-point may be sent to the corresponding wind turbine with e.g. an elapsed time between them. This way, each wind turbine may finally generate power according to the individual set-point in a smoother and more efficient manner. An aspect of this "step by step" or "progressive" approach may therefore be that the method may operate the wind farm in a more reliable manner when large variations of power generation are required through the corresponding grid requirement.

In implementations of the method, a second individual set-point (outside exclusion range) may be less than a lower limit of the exclusion range if the corresponding wind turbine is generating active power closer to the lower limit than to an upper limit of the exclusion range. In some embodiments, a second individual set-point (outside exclusion range) may be greater than an upper limit of the exclusion range if the corresponding wind turbine is generating active power closer to the upper limit than to a lower limit of the exclusion range.

In particular, if a wind turbine has been generating power inside exclusion range(s) for a certain period of time, the wind turbine may be forced to go outside its exclusion range(s). This may be performed by taking into account how close the power generated by the wind turbine is to an upper limit or to a lower limit of the exclusion range. If it is closer to the upper limit, the method may generate a new (second) individual set-point for causing the wind turbine to generate power (just) above said upper limit. If it is closer to the lower limit, the method may generate a new (second) individual set-point for causing the wind turbine to generate power (just) below said lower limit. This individual power variation may be compensated with other power variations for other wind turbines in order to satisfy the corresponding grid requirement.

In some cases, depending on how an exclusion range lower limit is defined, generating a second individual set-point below this lower limit may imply stopping the corresponding wind turbine. For example, if a wind turbine has been designed in such a way that resonance (undesired motions) occurs at very low rotational speeds, it may not be possible to operate the wind turbine below the lower limit of the corresponding exclusion range. In this case, the wind turbine may therefore be stopped.

According to implementations of the method, in generating an individual set-point for a wind turbine, active power generation of the wind turbine may be predicted based on one or more operational assumptions. Then, the individual set-point may be generated based on this prediction for causing a more reliable generation of the individual set-point. In particular embodiments, the one or more operational assumptions may comprise at least an estimated wind speed evolution for a given period of time.

With such a prediction-based approach (which may take into account e.g. an estimated evolution of the wind speed), a more reliable operation of the wind farm may result because reaction of wind turbines to the individual set-points to be generated may be anticipated and considered in calculations. For example, in a first iteration, initial individual set-points may be obtained and their effect on the wind turbines predicted. If this prediction produces acceptable results (e.g. satisfaction of the grid requirement is predicted), these initial set-points may be sent to the wind turbines for its implementation. If the prediction produces inacceptable results (e.g. dissatisfaction of the grid requirement is predicted), further iteration(s) may be performed in order to refine the individual set-points until acceptable (predicted) results are obtained.

Taking into account that the grid requirement may be an amount of variation of the total active power that is being generated by the corresponding wind together, the first individual set-points may be generated in a variety of different manners.

In a first embodiment of generating the first individual set-points, they may be generated based on distributing the amount of variation of the total active power equally among the corresponding wind turbines.

In a second embodiment, the first individual set-points may be alternatively generated based on the following rules. A first individual set-point may be set for a first wind turbine (of the first group) to an upper or lower limit of the corresponding individual exclusion range. Verification of whether the set of wind turbines is now generating the total active power may be performed. If the set of wind turbines is not generating the total active power, a first individual set-point may be set for another wind turbine (of the first group) to an upper or lower limit of the corresponding individual exclusion range.

A further verification of whether the set of wind turbines is now generating the total active power may be performed. In case of negative result of this verification, one or more repetitions may be performed of setting a first individual set-point for another wind turbine to an upper or lower limit of the corresponding individual exclusion range, and validating whether the set of wind turbines is now generating the total active power. Several of these repetitions may be performed until the set of wind turbines is determined to be generating the total active power or all the wind turbines have been "forced" to operate at exclusion range limit.

Still with reference to the second embodiment, some implementations may further comprise determining, for each wind turbine (of the first group), an out-of-range value representing how much the active power that is being generated by the wind turbine is away from being within exclusion range. The abovementioned first and another wind turbine may be individually selected (from the first group) in descending order of these determined out-of-range values. An aspect of this approach may be that wind turbines that are farther away from exclusion range are first processed, so less first individual set-points may be needed to achieve the total active power depending on the circumstances.

Particular implementations of the second embodiment may further comprise verifying whether all the wind turbines (of the first group) have been processed, in which case it means that all the wind turbines are operating at an exclusion range limit. In case of positive result, a first individual set-point for a first wind turbine may be set within the corresponding individual exclusion range. Verification of whether the set of wind turbines is now generating the total active power may be performed. In case of negative result, a first individual set-point for another wind turbine may be set within the corresponding individual exclusion range.

A further verification of whether the set of wind turbines is now generating the total active power may be performed. In case of negative result, one or more repetitions may be performed of setting a first individual set-point for another wind turbine within the corresponding individual exclusion range, and validating whether the set of wind turbines is now generating the total active power. Several of these repetitions may be performed until the set of wind turbines is determined to be generating the total active power or all the wind turbines have been "forced" to operate within exclusion range.

In a third alternative embodiment of generating the first individual set-points, they may be generated based on determining a percentage of variation of the active power that is being generated by the first group of wind turbines necessary for the set of wind turbines to generate the total active power. The amount of variation of the total active power may then be distributed among the first group of wind turbines by applying the same percentage of variation to each wind turbine (of the first group).

An aspect of the abovementioned second and third alternative embodiments of generating the first individual set-points may be that the risk of generating first individual set-points within exclusion range may be less in comparison with other approaches such as e.g. distributing the total reduction equally among the wind turbines.

In some implementations, the maximum period may be common to all the wind turbines of the first group of wind turbines. In alternative implementations, an individual maximum period may be defined period for each individual wind turbine of the first group of wind turbines. In further alternative implementations, a maximum period may be defined for each individual exclusion range, if some or all the wind turbines have more than one associated individual exclusion range.

The maximum period (or time threshold) may depend on e.g. the particular configuration of each wind turbine type or model. Optionally, other parameters may be further considered for predefining the predefined period(s), such as e.g. the location of the wind turbine in the wind farm. An aspect of having more maximum periods or limited times (depending on e.g. the abovementioned parameters) may be that the wind farm may be more reliably controlled according to the pursued double objective: satisfying the grid requirement and minimizing the risk of undesired motions of the wind turbines.

In some embodiments, such maximum periods may be predefined, e.g. pre-programmed for each wind turbine. In a further embodiment, a maximum period a wind turbine is allowed to operate in an exclusion range may be varied during the life time of a wind turbine. For example, depending on the fatigue damage accumulated of a wind turbine, the maximum period may be adjusted. Such a maximum period may thus be determined by an individual or central control system when needed.

In a second aspect, the invention provides a system for operating a set of wind turbines for generating and providing a total active power to a grid according to a grid requirement. A first group of wind turbines (of the set of wind turbines) are configured to generate an individual active power based on an individual set-point. The system comprises a control unit configured to perform any of the methods described hereinbefore. Since this system is suitable for performing any of such methods, aspects, advantages and principles commented with respect to these methods may also be attributed to this system.

BRIEF DESCRIPTION OF THE DRAWINGS

Non-limiting embodiments of the present disclosure will be described in the following, with reference to the appended drawings, in which.

DETAILED DESCRIPTION

In the following description, numerous specific details are set forth in order to provide a thorough understanding of embodiments of the present invention. It will be understood by one skilled in the art however, that embodiments of the present invention may be practiced without some or all of these specific details. In other instances, well known elements have not been described in detail in order not to unnecessarily obscure the description of the embodiments of the present invention.

Figure 1:
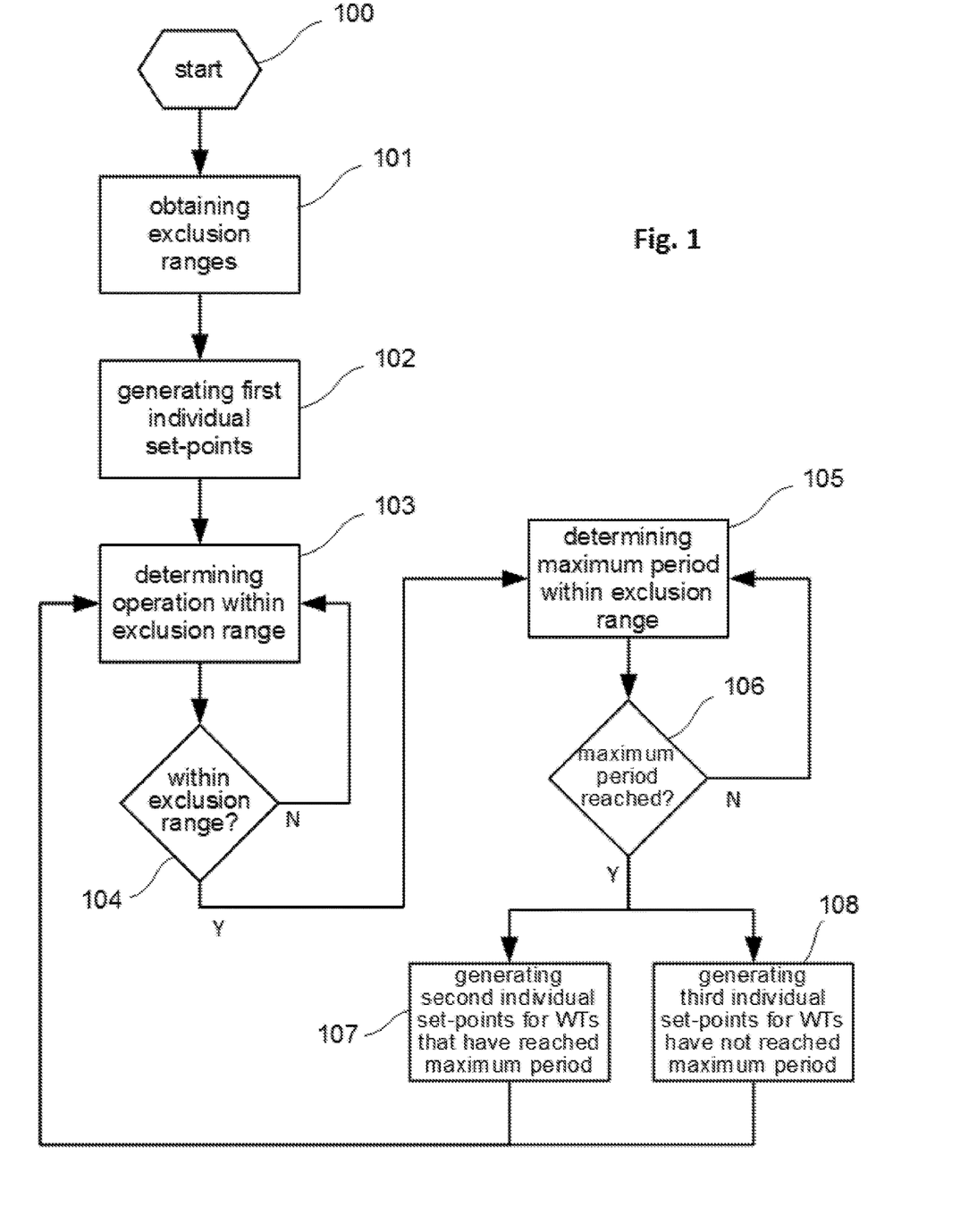
FIG. 1 is a flow chart schematically representing an embodiment of a method of operating a set of wind turbines according to an implementation.

FIG. 1 is a flow chart schematically representing an embodiment of a method of operating a set of wind turbines according to an implementation. This method may be aimed at managing power generation by at least some of the wind turbines (i.e. a set of wind turbines) of a wind farm. In particular, the method may be aimed at operating this set of wind turbines in order to generate and provide a total active power to the grid based on a grid requirement (e.g. reduction of power generation).

A first group of wind turbines of the set of wind turbines may be configured to generate an individual active power based on an individual set-point. The method may be aimed at providing one or more of the wind turbines of the first group with corresponding individual set-points to globally generate the abovementioned total active power. The first group of wind turbines may comprise all wind turbines of a set of wind turbines, such as a wind farm.

The method may start at block 100, at which a grid requirement issued by a grid operator may be received. This grid requirement may request a variation of the currently generated power by the set of wind turbines. This power variation may be a reduction of the currently generated power in order to compensate an unplanned excess of power in the grid.

Once the grid requirement has been received, the method may proceed to block 101 for obtaining one or more individual exclusion ranges for at least some wind turbines of the set of wind turbines. As said exclusion ranges may be completely or almost invariable, in alternative implementations, they may be obtained just once to be used in all the iterations (or instances or threads) of the method.

Once the individual exclusion ranges have been obtained at block 101, the method may continue to block 102, which may comprise generating first individual set-points for causing the set of wind turbines to generate the total active power. This may be performed in a variety of manners, some of which will be described below. Block 102 may further comprise sending the generated first individual set-points for causing the corresponding wind turbines to operate according to them.

In a possible implementation of block 102, the first individual set-points may be generated based on distributing the requested variation of the total active power equally among the corresponding wind turbines. Suppose a situation in which the method is controlling three wind turbines WT1, WT2 and WT3, and the received grid requirement indicates a reduction of 4.5 MW in the total active power that is being generated by these wind turbines together. Suppose also that WT1 is generating 3 MW, WT2 is generating 2.5 MW, and WT3 is generating 2 MW, and that the three wind turbines have a common exclusion range of between 0.3 MW and 1 MW.

In this particular embodiment of implementation of block 102, the method would produce first individual set-points for each of the three wind turbines to reduce 1.5 MW its power production. Therefore, WT1 would be conducted to produce 1.5 MW (outside exclusion range), WT2 would be conducted to produce 1 MW (at exclusion range limit), and WT3 would be conducted to produce 0.5 MW (within exclusion range). In the case of WT3, it will be monitored to remain within exclusion range for a limited period of time, which is explained in other parts of the description.

In an alternative implementation of block 102, the first individual set-points may be generated based on processing the wind turbines (of the first group) in the following manner. In a sub-block A, a first individual set-point may be set for a first/next wind turbine to an upper or lower limit of its individual exclusion range. In a sub-block B, verification of whether the set of wind turbines is now generating the total active power may then be performed. In case of negative result, sub-blocks A and B may be repeated until the set of wind turbines is determined to be generating the total active power or all the wind turbines (of the first group) have been "forced" to operate at a limit of an exclusion range. The abovementioned first/next wind turbine would be a first wind turbine in a first iteration of sub-blocks A and B, and would be a next wind turbine in subsequent iterations.

Block 102 may further comprise determining, for each wind turbine (of the first group) an out-of-range value representing how much the active power that is being generated by the wind turbine is away from being within exclusion range. The first/next wind turbine may then be individually selected (in successive iterations of sub-blocks A and B) in descending order of these determined out-of-range values.

Block 102 may further comprise verifying whether all the wind turbines (of the first group) are operating at exclusion range limit. In case of positive result, in a sub-block C, a first individual set-point may be set for a first/next wind turbine within its individual exclusion range. In a sub-block D, verification of whether the set of wind turbines is now generating the total active power may then be performed. In case of negative result, sub-blocks C and D may be repeated until the set of wind turbines is determined to be generating the total active power or all the wind turbines (of the first group) have been "forced" to operate within exclusion range limit. This last first/next wind turbine would be a first wind turbine in a first iteration of sub-blocks C and D, and would be a next wind turbine in subsequent iterations of sub-blocks C and D.

In the abovementioned situation of WT1, WT2 and WT3, this last implementation of block 102 would cause WT1 to reduce its generation from 3 MW to 1 MW (i.e. reduction=2 MW). WT2 would reduce its generation from 2.5 MW to 1 MW (i.e. reduction=1.5 MW), and WT3 would reduce its generation from 2 MW to 1 MW (i.e. reduction=1 MW). In this case, the total reduction of 4.5 MW (i.e. grid requirement) would be achieved without "forcing" any of the three wind turbines to operate within exclusion range. The three wind turbines have been forced to operate at exclusion range limit (1 MW).

In a further alternative implementation of block 102, the first individual set-points may be generated based on determining a percentage of variation of the active power that is being generated by the first group of wind turbines necessary for the set of wind turbines to generate the total active power. The amount of variation of the total active power may then be distributed among the first group of wind turbines by applying the same percentage of variation to each wind turbine (of the first group).

Following with the previous embodiment of the three wind turbines WT1, WT2 and WT3, the total active power that is being generated by the wind turbines would be of 7.5 MW (=3 MW+2.5 MW+2 MW). The 3 MW that are being produced by WT1 represents the 40% of the total active power of 7.5 MW, so power production by WT1 would be reduced by 1.8 MW (i.e. the 40% of the 4.5 MW of total reduction). The 2.5 MW that are being produced by WT2 represents the 33% of the total active power of 7.5 MW, so power production by WT2 would be reduced by 1.5 MW (i.e. the 33% of the 4.5 MW of total reduction). The 2 MW that are being produced by WT3 represents the 27% of the total active power of 7.5 MW, so power production by WT3 would be reduced by 1.2 MW (i.e. the 27% of the 4.5 MW of total reduction).

At block 103, the method may comprise determining whether one or more of the wind turbines are operating within individual exclusion range. Then, at block 104, the method may continue to block 105 if operation of some of the wind turbines has been determined to be within individual exclusion range. Otherwise, the method may loop back to block 103 if none of the wind turbines has been determined operating within individual exclusion range.

At block 105, the method may comprise monitoring the operation of the wind turbine(s) within exclusion range to detect when one or more of said wind turbines have reached a maximum period. At block 106, if one or more of the wind turbines have reached said maximum period, the method may continue to blocks 107 and 108 for recalculating individual set-points in order to force said wind turbines to go outside exclusion range while satisfying the grid requirement. Otherwise, the method may loop back to block 105. The wind turbines that are operating within an exclusion range are therefore allowed to be inside the exclusion range for a limited period of time only, which may reduce the risk of said wind turbines suffering problematic loads and/or movements, which may lead to e.g. fatigue damage in the long term.

Block 105 may comprise initiating a timer for each wind turbine inside exclusion range(s). When one or more of said timers achieve a time value substantially equal to the (predefined) maximum period or time threshold, a new iteration may be performed for generating new suitable (second and third) individual set-points. These new set-points would be aimed at causing the wind turbines that have been inside exclusion range(s) for the limited time to go outside exclusion range(s).

At block 107, the method may comprise generating second individual set-points for these wind turbines that have reached the predefined period within exclusion range. Block 107 may further comprise sending these second individual set-points for causing the corresponding wind turbines (which have reached the predefined period) to operate according to them, i.e. outside exclusion range.

Generating the second individual set-points (at block 107) may comprise generating at least some individual (second) set-points below a lower limit or above an upper limit of the corresponding exclusion range, depending on the circumstances. If a wind turbine has been generating active power for the limited period of time within exclusion range and it is currently generating power closer to the lower limit than to the upper limit, the corresponding (second) set-point may be generated (just) bellow the lower limit. If a wind turbine has been generating power for the limited period of time within exclusion range and it is currently generating power closer to the upper limit than to the lower limit, the corresponding (second) set-point may be generated (just) above the upper limit.

At block 108, the method may comprise generating third individual set-points for wind turbines which have not reached the predefined period within exclusion range, to compensate variations on the total active power caused by the second individual set-points. With such compensation(s), the set of wind turbines may be "returned" to globally generate the desired total active power once second individual set-points have been generated for those wind turbines whose predefined period within exclusion region has been reached. Block 108 may be implemented equally or similarly to block 103 but only considering, in this case, the wind turbines other than those that have reached the predefined period (of limited time) inside exclusion range. Block 108 may thus be based on distributing a total active power variation (indicated by the grid requirement) among these particular wind turbines on the basis of different criteria. For example, this distribution may be performed equally, depending on corresponding out-of-range values, depending on a percentage of variation of the active power that is being generated by the first group of wind turbines, etc.

Block 108 may further comprise sending the generated third individual set-points for causing the corresponding wind turbines (other than those that have reached the predefined period) to operate according to them.

Once blocks 107 and 108 have been completed, the method may loop back to block 103 for continuing the monitoring of wind turbines and determining whether the new generated (second and third) individual set-points have caused some wind turbine(s) to go inside individual exclusion range.

In some embodiments, block 100 may further comprise receiving the total active power effectively caused to be generated by the individual set-points generated in a previous iteration. Then, block 100 may further comprise verifying if the received (sensed) total active power satisfies the grid requirement. In the case of a positive result of said verification, block 100 may remain waiting for a new grid requirement. In the case of negative result of said verification, a new iteration may be initiated in order to generate new (first, second, third) individual set-points aimed at satisfying the grid requirement while trying to cause acceptable rotor speeds or unacceptable rotor speeds but for a limited time.

Figure 2:
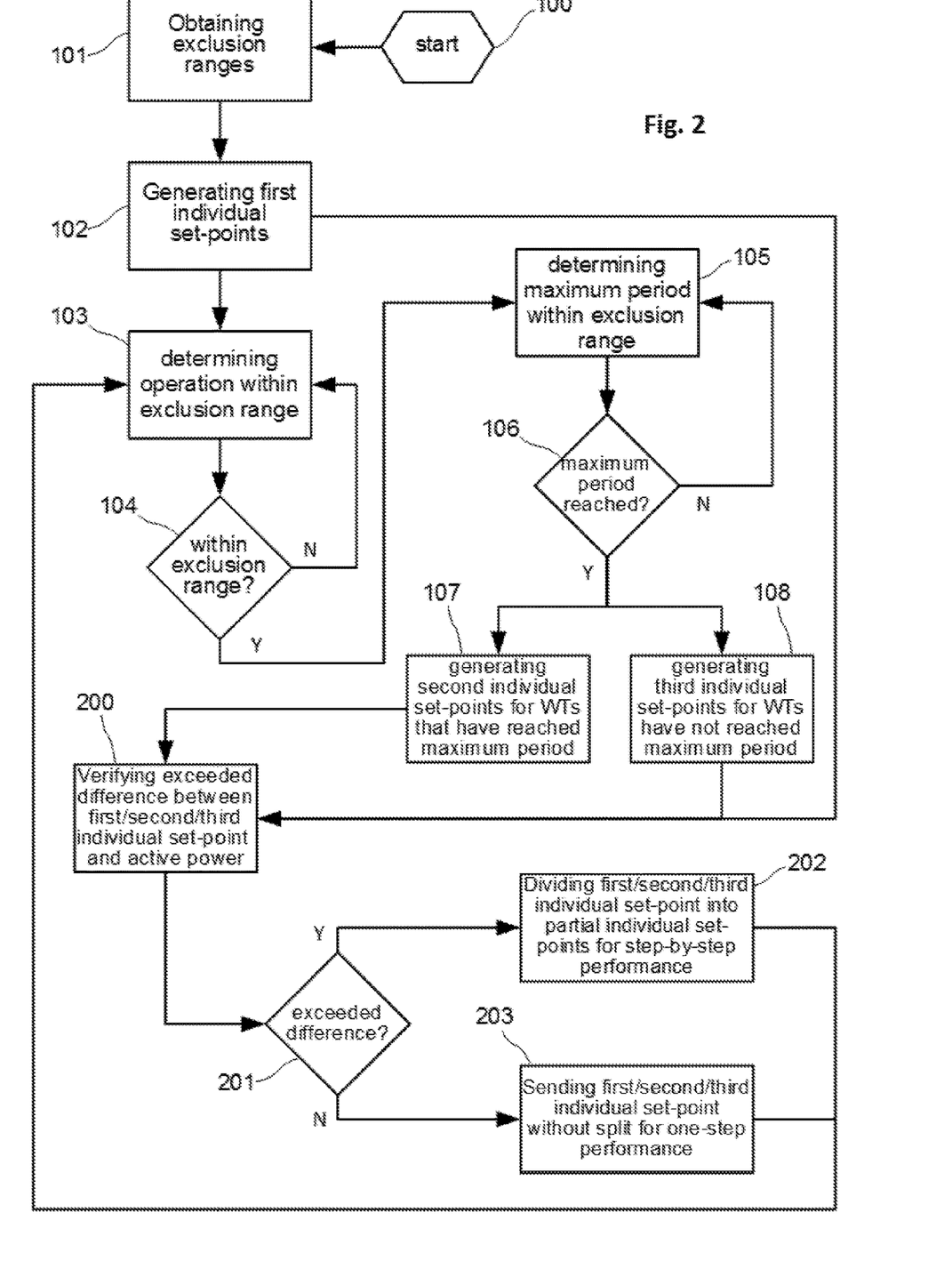
FIG. 2 is a flow chart schematically representing another embodiment of a method of operating a set of wind turbines according to an implementation.

FIG. 2 is a flow chart schematically representing another embodiment of a method of operating a set of wind turbines according to an implementation. This method is similar in some ways to the one depicted by FIG. 1, so some references used in FIG. 1 have been re-used in FIG. 2 to indicate equal or similar method blocks. One difference is that e.g. in the method of FIG. 2, individual set-points are not sent to corresponding wind turbines by the blocks which have generated them. In particular, first individual set-points are not sent by block 102, second individual set-points are not sent by block 107, and third individual set-points are not sent by block 108.

Instead of that, once first, second, third individual set-points have been generated by blocks 102, 107, 108 respectively, the method may continue to block 200. This block 200 may comprise, for each (first, second, third) individual set-point, verifying if a difference between the individual set-point and the active power that is being generated by the corresponding wind turbine exceeds a difference threshold. The difference threshold may be (pre)defined in such a way that if it is exceeded by an individual set-point, this individual set-point may be considered particularly hard to be performed at once by the corresponding wind turbine.

Therefore, in the case of a positive result of the previous verification (block 200), the method may proceed (at block 201) to block 202 for processing those individual set-points considered of particularly hard execution at once by the corresponding wind turbine. In the case of a negative result of this verification (block 200), the method may proceed (at block 201) to block 203 for processing those individual set-points not considered of particularly hard execution at once by the corresponding wind turbine.

At block 202, the method may comprise, for each (first, second, third) individual set-point that cannot be reached in a single step, dividing it into a plurality of partial individual set-point, such that all said partial individual set-points substantially totalizes the individual set-point. Block 202 may then send, for each of those individual set-points, the corresponding partial individual set-points with a delay between them. This way, each of these individual set-points may be progressively achieved by the corresponding wind turbine by performing the corresponding partial individual set-points with an elapsed time between them.

This "step by step" or "progressive" approach may be beneficial when large variations of power generation are requested by the corresponding grid requirement. In this case, (first, second, third) individual set-points may be generated which cannot be immediately matched by individual wind turbine due to inherent limits of the reaction speed/actuation speed of components of the wind turbines. An aspect of this solution may thus be that the method may operate the wind farm in a more reliable and efficient manner when large variations of the power generation have to be processed.

At block 203, the method may comprise sending, without any previous split, each of the (first, second, third) individual set-points which have not been considered too hard of being performed at once by the corresponding wind turbine.

Once blocks 202 and 203 have been completed, the method may loop back to block 103 for continuing the monitoring of wind turbines and determining whether the new generated (second and third) individual set-points have caused some wind turbine(s) to go inside individual exclusion range.

Although only a number of embodiments have been disclosed herein, other alternatives, modifications, uses and/or equivalents thereof are possible. Furthermore, all possible combinations of the described embodiments are also covered. Thus, the scope of the present disclosure should not be limited by particular embodiments, but should be determined only by a fair reading of the claims that follow.

What is claimed is:

1. A method of operating a set of wind turbines for generating and providing a total active power demand to a grid according to a grid requirement, wherein a first group of wind turbines of the set of wind turbines is configured to generate an individual active power based on an individual set-point, the method comprising:
    obtaining one or more individual exclusion ranges for the first group of wind turbines;
    generating first individual set-points for the first group of wind turbines such that the set of wind turbines generates the total active power;
    determining whether a selection of the first group of wind turbines are operating within an individual exclusion range; and
    in case of positive result of said determination, limiting the operation of the selection of wind turbines within exclusion range to a maximum period, and when the maximum period is reached by any of the wind turbines of the selection of wind turbines:
        generating second individual set-points for the wind turbines of the selection of wind turbines that have reached the predefined maximum period, to cause these wind turbines to operate outside the exclusion range; and
        generating third individual set-points for one or more other wind turbines of the first group of wind turbines to cause the set of wind turbines to generate the demanded total active power.

2. The method according to claim 1, further comprising:
    for each of the generated individual set-points:
    verifying if a difference between the individual set-point and the active power that is being generated by the corresponding wind turbine exceeds a difference threshold; and
    in case of positive result of said verification, dividing the individual set-point into a plurality of partial individual set-points, such that this plurality of partial individual set-points substantially totalizes the individual set-point, such that the individual set-point may be progressively achieved by the corresponding wind turbine.

3. The method according to claim 2, wherein a second individual set-point is less than a lower limit of the exclusion range if the corresponding wind turbine is generating active power closer to the lower limit than to an upper limit of the exclusion range.

4. The method according to claim 2, wherein a second individual set-point is greater than an upper limit of the exclusion range if the corresponding wind turbine is generating active power closer to the upper limit than to a lower limit of the exclusion range.

5. The method according to claim 2, wherein in generating an individual set-point for a wind turbine:
active power generation of the wind turbine is predicted based on one or more operational assumptions; and
the individual set-point is generated based on this prediction for causing a more reliable generation of the individual set-point.

6. The method according to claim 1, wherein the second individual set-point is less than a lower limit of the exclusion range if the corresponding wind turbine is generating active power closer to the lower limit than to an upper limit of the exclusion range.

7. The method according to claim 6, wherein a second individual set-point is greater than an upper limit of the exclusion range if the corresponding wind turbine is generating active power closer to the upper limit than to a lower limit of the exclusion range.

8. The method according to claim 1, wherein the second individual set-point is greater than an upper limit of the exclusion range if the corresponding wind turbine is generating active power closer to the upper limit than to a lower limit of the exclusion range.

9. The method according to claim 1, wherein in generating an individual set-point for a wind turbine:
active power generation of the wind turbine is predicted based on one or more operational assumptions; and
the individual set-point is generated based on this prediction for causing a more reliable generation of the individual set-point.

10. The method according to claim 9, wherein the one or more operational assumptions comprise at least an estimated wind speed evolution for a given period of time.

11. The method according to claim 10, wherein the grid requirement is an amount of variation of the total active power, and the first individual set-points are generated based on distributing this amount equally among the corresponding wind turbines.

12. A method according to claim 10, wherein the grid requirement is an amount of variation of the total active power, and the first individual set-points are generated based on:
(a) setting a first individual set-point for a first wind turbine of the first group to an upper or lower limit of the corresponding individual exclusion range, and verifying whether the set of wind turbines generates the total active power, and in case of negative result:
(b) setting a first individual set-point for another wind turbine of the first group to an upper or lower limit of the corresponding individual exclusion range, and
(c) verifying whether the set of wind turbines generates the total active power, and in case of negative result, repeating (b) and (c).

13. The method according to claim 12, further comprising:
determining, for each wind turbine of the first group, an out-of-range value representing how much the active power that is being generated by the wind turbine is away from being within exclusion range, wherein the first and another wind turbine are individually selected from the first group of wind turbines in descending order of the determined out-of-range values.

14. The method according to claim 13, further comprising:
verifying whether (a) or (b) has been performed for all the wind turbines of the first group of wind turbines, and in case of positive result:
(d) setting a first individual set-point for a first wind turbine of the first group within the corresponding individual exclusion range, and verifying whether the set of wind turbines generates the total active power, and in case of negative result:
(e) setting a first individual set-point for another wind turbine of the first group within the corresponding individual exclusion range, and
(f) verifying whether the set of wind turbines generates the total active power, and in case of negative result, repeating (e) and (f).

15. The method according to claim 12, further comprising:
verifying whether (a) or (b) has been performed for all the wind turbines of the first group of wind turbines, and in case of positive result:
(d) setting a first individual set-point for a first wind turbine of the first group within the corresponding individual exclusion range, and verifying whether the set of wind turbines generates the total active power, and in case of negative result:
(e) setting a first individual set-point for another wind turbine of the first group within the corresponding individual exclusion range, and
(f) verifying whether the set of wind turbines generates the total active power, and in case of negative result, repeating (e) and (f).

16. The method according to claim 10, wherein the grid requirement is an amount of variation of the total active power, and the first individual set-points are generated based on:
determining a percentage of variation of the active power that is being generated by the first group of wind turbines necessary for the set of wind turbines to generate the total active power; and
distributing the amount of variation of the total active power among the first group of wind turbines by applying the same percentage of variation to each wind turbine of the first group.

17. The method according to claim 1, wherein the grid requirement is a reduction of the total active power.

18. The method according to claim 1, wherein the maximum period is common to all the wind turbines of the first group.

19. The method according to claim 1, wherein an individual maximum period is defined for each individual wind turbine of the first group.

20. A system for operating a set of wind turbines for generating and providing a total active power to a grid according to a grid requirement, wherein a first group of wind turbines of the set of wind turbines is configured to generate an individual active power based on an individual set-point, the system comprising a control unit configured to perform the method according to claim 1.

* * * * *